United States Patent [19]

Trusock

[11] Patent Number: 4,658,189

[45] Date of Patent: Apr. 14, 1987

[54] SERIES CONNECTED SERIES MOTORS FOR INDEPENDENT LOADS

[75] Inventor: George J. Trusock, Battle Creek, Mich.

[73] Assignee: Clark Equipment Company, Buchanan, Mich.

[21] Appl. No.: 904,569

[22] Filed: Sep. 5, 1986

Related U.S. Application Data

[63] Continuation of Ser. No. 656,152, Sep. 28, 1984, abandoned.

[51] Int. Cl.⁴ .......................... B61C 15/14; H02P 7/68
[52] U.S. Cl. ...................................... 318/52; 318/113; 318/139
[58] Field of Search ................. 318/52, 113, 111, 139, 318/293

[56] References Cited

U.S. PATENT DOCUMENTS

| | | | |
|---|---|---|---|
| 2,930,957 | 3/1960 | Cronberger | 318/71 X |
| 3,760,246 | 9/1973 | Gurwicz et al. | 318/52 |
| 4,136,303 | 1/1979 | Almquist et al. | 318/52 |
| 4,410,947 | 10/1983 | Strong et al. | 318/52 X |

FOREIGN PATENT DOCUMENTS 1232615 5/1971 United Kingdom .

Primary Examiner—William M. Shoop, Jr.
Assistant Examiner—Bentsu Ro
Attorney, Agent, or Firm—Reising, Ethington, Barnard, Perry & Milton

[57] ABSTRACT

A traction drive system for a vehicle is disclosed which comprises a pair of series wound motors (32,34) which are connected in series with each other and which drive independent traction wheels (22,24), respectively, of the vehicle. The no-load torque of each traction wheel is correlated with the transient torque characteristic of the motors so that each motor produces a transient driving torque greater than the threshold-load torque of the wheels. Further, the no-load torque of each wheel is great enough so that the transient driving torque will not fall below the threshold-load torque during a predetermined time interval. This arrangement permits one traction wheel to move the vehicle at low speed while the other traction wheel spins on ice or otherwise fails to exhibit tractive effort.

3 Claims, 5 Drawing Figures

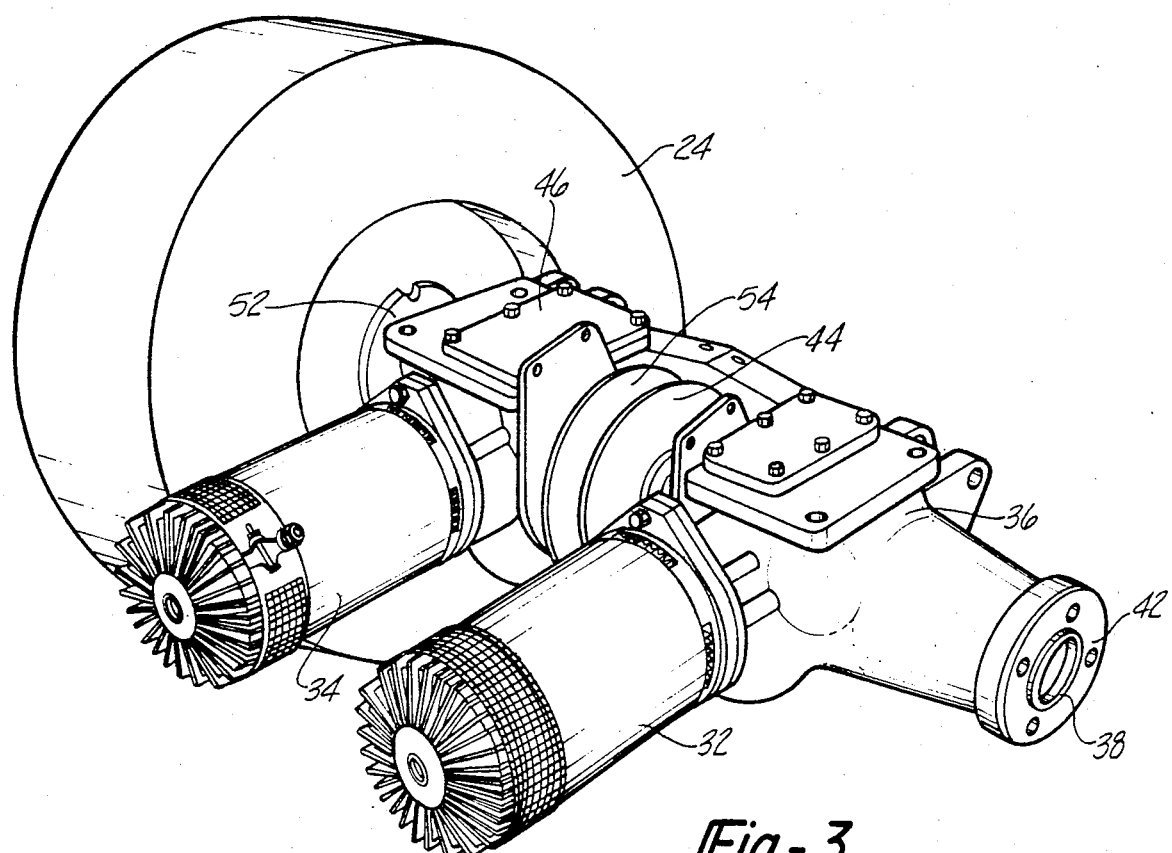
*Fig-3*
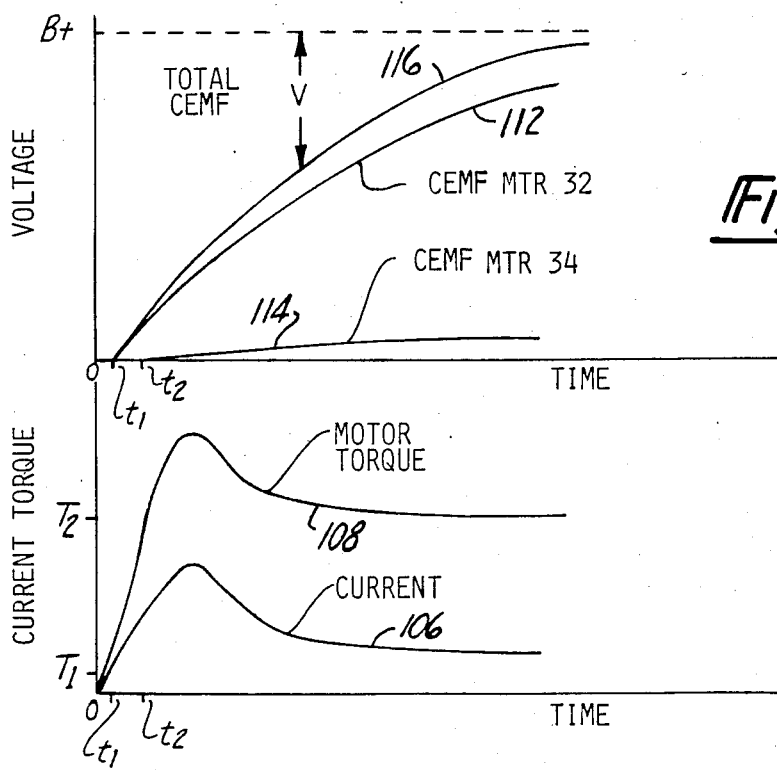
*Fig-4a*
*Fig-4b*

SERIES CONNECTED SERIES MOTORS FOR INDEPENDENT LOADS

This is a continuation of application Ser. No. 656,152, filed on Sept. 28, 1984, now abandoned.

FIELD OF THE INVENTION

This invention relates to motive power systems; more particularly, it relates to a drive system using series DC motors in a series connection for driving independent loads.

BACKGROUND OF THE INVENTION

This is a continuation of application Ser. No. 656,152, filed on Sept. 28, 1984, now abandoned.

In certain applications, it is desirable to drive two independent load devices with separate series wound DC motors which are connected in a series circuit and energized from a common voltage source. A particular example is the motive power system for an industrial truck which gave rise to the discovery and invention set forth herein. It has been the practice in certain industrial trucks to use two separate series motors for driving the two traction wheels. The reason for using two separate motors instead of one larger motor is cost; the power train using a single large motor costs considerably more than separate drive trains using two smaller motors. Heretofore, the two series motors have been connected electrically in parallel and each motor is provided with its own separate reversing contactor and certain other separate circuit components.

It has been recognized that additional cost savings could be realized if the two separate series wound drive motors could be connected electrically in series instead of parallel. In such an arrangement, a single reversing contactor and other circuit components could be used in common for both motors. However, the connection of DC series motors in series with each other has heretofore required special control circuits which add considerable cost and complexity and result in reduced reliability of the system.

According to conventional wisdom, DC series motors connected in series with each other cannot be operated to drive independent loads without some form of special control circuit to control the voltage across the respective motors. The reason behind this conventional thinking is as follows. If one motor has no load or light load and the other motor has a heavy load, the motor without load will have greater acceleration and will reach a high speed before the heavily loaded motor starts. The motors develop a counter electromotive force (EMF) as a direct function of speed. The speed of the lightly loaded motor increases quickly to the point where the counter EMF produced thereby is substantially equal to the applied voltage while the loaded motor remains at standstill and develops no counter EMF. The applied voltage is said to be equal to the sum of the counter EMF and the IR drop, i.e. the voltage drop produced by the current through the series resistances of the armatures and field windings of the motors. The torque produced by a series motor is proportional to the product of the field current and the armature current. The effect of increasing counter EMF due to the increasing speed of the unloaded motor is to reduce the current through the fields and armatures of the two motors so that very little torque is produced by the motors. As a result, the heavily loaded motor remains at standstill while the unloaded motor spins at high speed. In the case of a vehicle drive using series connected series motors for independent traction wheels, the vehicle would remain at standstill if one traction wheel is on ice or is off the ground while the other traction wheel is on the ground.

In the prior art, the problem of series motors in series connection with independent loads has been solved by providing special control circuits for controlling the voltage across the respective motors. A typical example of such prior art is the Cronberger U.S. Pat. No. 2,930,957 which issued Mar. 29, 1960. The system of the Cronberger patent utilizes speed sensing or voltage sensing means for the respective motors and when one motor runs faster than the other the field current of that motor is shunted to allow the speeds to equalize.

A general object of this invention is to overcome certain disadvantages of the prior art.

SUMMARY OF THE INVENTION

In accordance with this invention, a traction drive system for an industrial truck is provided which comprises first and second series wound motors connected in series with each other and driving first and second independent traction wheels of the truck without any special control circuit for controlling the voltage applied to the respective motors. This is accomplished by correlating the start-up no-load torque characteristic of the traction wheels with the transient torque characteristic of the motors so that each motor produces a predetermined transient driving torque when the wheel coupled to it exhibits a no-load torque, i.e. the torque required to rotate the wheel when there is no adhesive friction with the road, and the other motor, when the wheel coupled to it exhibits a threshold-load torque, i.e. the torque required to initiate motion of the vehicle when there is non-slip adhesive friction with the road, said predetermined transient driving torque having a peak value which is greater than the threshold-load torque whereby said truck may be moved by traction of the wheel which exhibits a threshold-load torque during said peak value.

Further, in accordance with this invention, a traction drive system is provided for a vehicle having first and second traction wheels which are independently rotatable. Both of the wheels exhibit substantially the same start-up and running load torques when both have non-slip adhesive friction with the road. First and second DC series motors which are substantially identical to each other are connected electrically in a series circuit with each other and switching means is provided for connecting the series circuit across a voltage source. The first and second motors are respectively mechanically coupled, independently of each other, in driving relation with the first and second wheels of the vehicle. Each traction wheel is subject to exhibiting a start-up load ranging from the threshold-load torque to the no-load torque. Upon start-up from a given starting condition, either one of said wheels may exhibit the no-load torque and the other of said wheel may exhibit the threshold-load torque. The impedance of the series circuit is low enough to draw a transient current, starting when the switching means is closed, which causes each motor to produce a transient driving torque greater than the threshold-load torque whereby both wheels are accelerated and said driving transient torque is reduced as a result of the counter EMF of said motors. The no-load torque of each wheel is great enough so that the transient driving torque applied to said other wheel is not reduced below the threshold-load torque of said other wheel. Accordingly, the vehicle may be moved by the traction of said other wheel to a location where the one wheel encounters non-slip adhesive friction with the road. Further, speed control means is connected in the circuit for varying the voltage applied to the motors. Also, switching means is connected in the circuit for reversing the polarity of the voltage applied to the field windings for reversal of said motors.

A more complete understanding of this invention may be obtained from the detailed description that follows taken with the accompanying drawings.

DESCRIPTION OF THE DRAWINGS

FIG. 3 shows the construction of the traction drive system;

FIGS. 4a and 4b are graphical repesentations of motor voltage, current and torque for use in aiding the explanation of the operation.

BEST MODE FOR CARRYING OUT THE INVENTION

Figure 1:
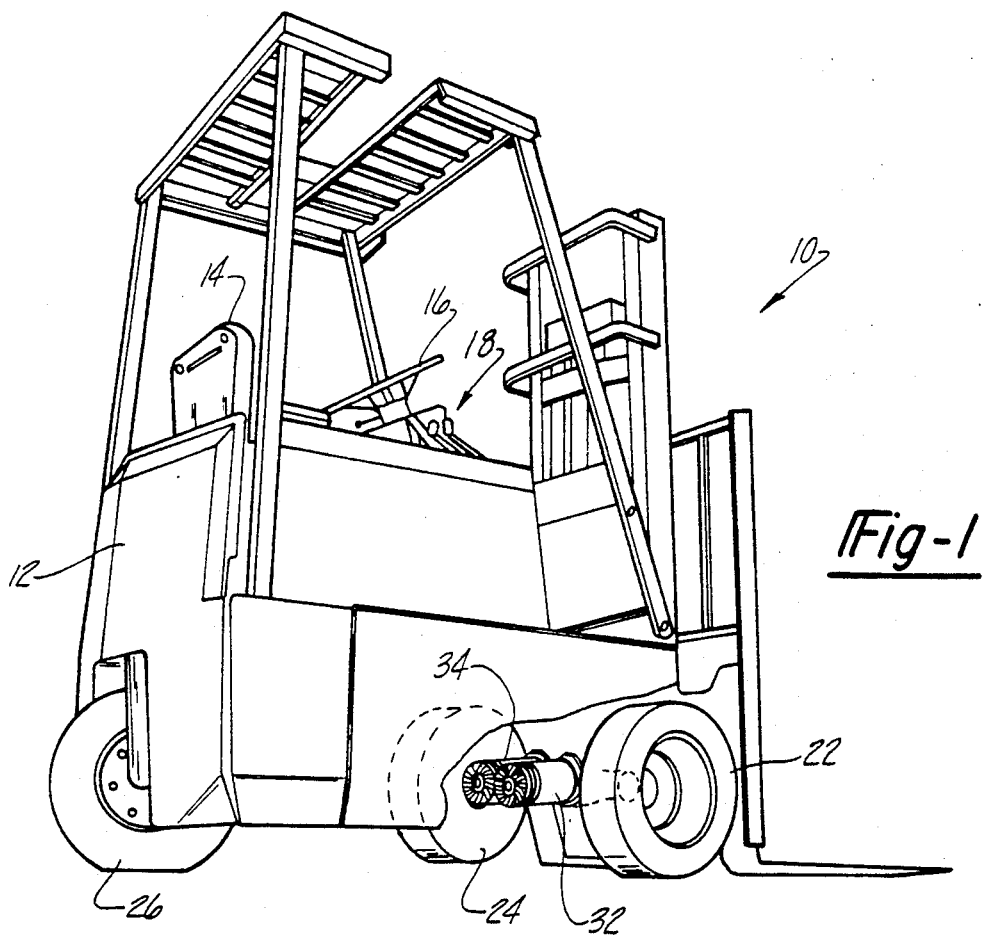
FIG. 1 is a pictorial view of an industrial truck which is provided with a traction drive system in accordance with this invention.

Referring now to the drawings, there is shown an illustrative embodiment of this invention in the traction drive system of an industrial truck. It will be appreciated as the description proceeds that the invention is useful in many applications and embodiments.

FIG. 1 shows a pictorial view of an industrial truck 10 which is provided with a traction drive system according to this invention. The truck 10 comprises a body 12 provided with a driver's seat 14, a steering wheel 16 and a control panel 18. The truck has a front wheel drive which includes a traction wheel 2 on the right side and a traction wheel 24 on the left side. The truck is provided with a single dirigible wheel 26 which is controlled by the steering wheel 16. The traction wheel 22 is driven by an electric traction motor 32 and the traction wheel 24 is driven by an electric traction motor 34.

Each of the motors 32 and 34 is a conventional DC series wound motor, i.e. the field winding and armature winding are connected in series. The two motors 32 and 34 are substantially identical with each other, i.e. they are of the same construction and rating. The mechanical and electrical connection of the motors 32 and 34 will be described subsequently.

The mechanical arrangement of the traction drive system is shown in greater detail in FIG. 3. The motor 32 is mounted on an axle housing 36 which houses a gear reducing drive train. The armature shaft of the motor 32 is coupled through the drive train to the axle 38 which carries a wheel hub 42. The traction wheel 22 is mounted on the wheel hub 42. The wheel 22 is provided with a disk brake 44 mounted inboard of the axle housing 36. In a similar manner, the motor 34 is mounted on an axle housing 46 which houses a gear reducing drive train. The armature shaft of the motor 34 is connected through the drive train to the axle (not shown) which carries a wheel hub 52. The traction wheel 24 is mounted on the wheel hub 52. The wheel 24 is provided with a disk brake 54 which is mounted inboard of the axle housing 46. It is noted that the axle housings 36 and 46 are mechanically connected with each other. However, the drive train from the motor 32 to the traction wheel 22 is entirely separate from the drive train from the motor 34 to the traction wheel 24. The wheels 22 and 24 are independently rotatable and constitute separate and independent loads for the respective motors 32 and 34.

Figure 2:
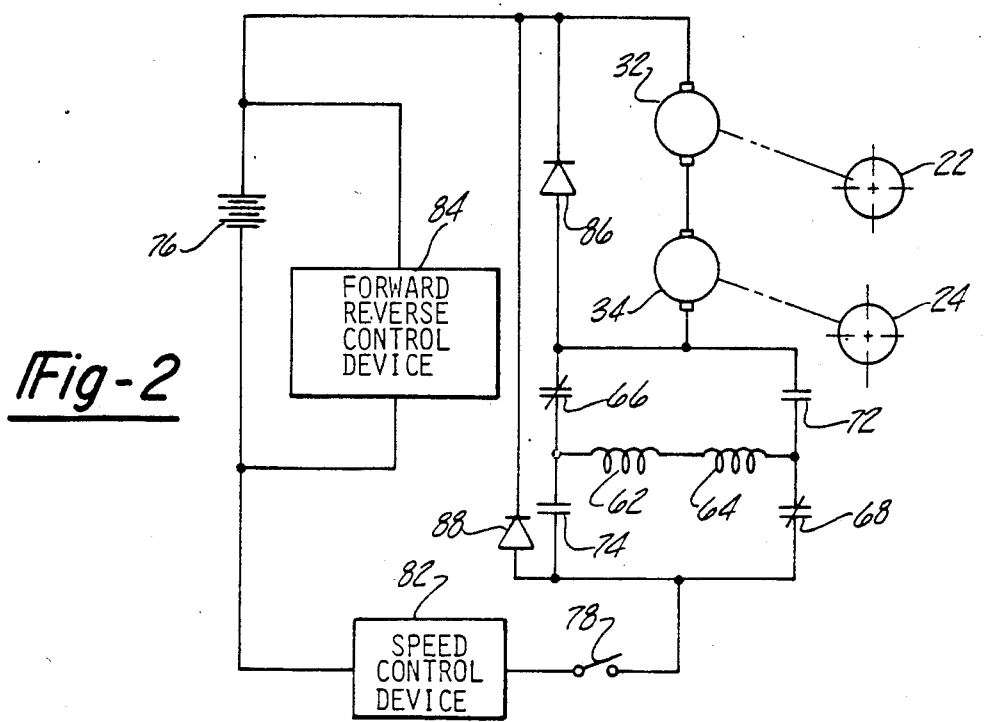
FIG. 2 is a schematic diagram of the traction drive system of this invention.

The electrical circuit of the traction drive system is shown schematically in FIG. 2. The motors 32 and 34 are connected in series with each other and the motor 32 has a field winding 62 and the motor 34 has a field winding 64. The field windings 62 and 64 are connected in series with each other and are connected in series with the armature of the motors 32 and 34 through a reversing contactor. The contactor comprises a set of normally closed forward contacts 66 and 68 and a set of normally open reverse contacts 72 and 74. The series connected motors are connected across the vehicle battery 76 through a start switch 78 and a conventional speed control device 82. The reversing contactor is controlled by a forward-reverse control device 84. A protective or free-wheeling diode 86 is connected across the armatures of the motors 32 and 34. Also, a plugging diode 88 is connected across the series combination of the field windings and the armatures of the motors 32 and 34.

The series circuit of the motors 32 and 34 has an impedance, i.e. the resistance and inductance of the field windings and the armature windings and other circuit elements, such that the transient current initiated by applying starting voltage to the motors is sufficiently high that the driving torque developed by each motor rises above the threshold-load torque of the vehicle. The threshold-load torque of the vehicle is that required to initiate motion of the vehicle when there is a non-slip adhesive friction of the traction wheels with the road. Further, each of the traction wheels and its respective drive train from the motor has sufficiently high moment of inertia and friction so that the no-load torque exhibited by each wheel keeps the speed of the motor from reaching a value which would produce a counter EMF that would reduce the driving torque below the threshold-load torque. The no-load torque is the torque required to rotate the wheel when there is no adhesive friction with the road.

The operation of the traction drive system will be explained with reference to the graphs of FIGS. 4a and 4b. For explanatory purposes, it will be assumed that the vehicle is to be started from a standstill and brought up to a desired speed under the control of the driver. For this purpose, the start switch 78 is closed and the driver may advance the control lever of the speed control device 82 as desired. Assuming that both traction wheels 22 and 24 are resting on a dry road surface there will be a non-slip adhesive friction between the road and the wheels. Both of the traction wheels will exhibit substantially the same start-up and running load torques under this starting condition. The motors 32 and 34, as is characteristic of series wound motors, produce a high starting torque. Since the motors are identical and the load torques exhibited by the respective traction wheels are substantially the same, the motors have about the same acceleration. Accordingly, the wheels are brought up to running speed together to attain the desired speed of the vehicle. As the motors come up to speed together, the counter EMF produced by each of the motors increases and accordingly the motor current and torque decreases. Both motors produce the same counter EMF and since the motor current is the same for both motors, the IR drop is the same for both motors. Thus, the two motors share the load equally.

Now, for explanatory purposes, it will be assumed that the vehicle is to be started from standstill and that traction wheel 22 is resting on a patch of ice and traction wheel 24 is resting on a dry road surface. The traction wheel 24, being on dry road, will exhibit sufficient reaction torque when driving torque is applied thereto from the motor 34 to initiate motion of the vehicle. This reaction torque, which is equal and opposite to the applied torque, is herein referred to as the theshold-load torque. On the other hand, when this torque is applied to the traction wheel 22 by the motor 32 it will not exhibit sufficient reaction torque to significantly assist in moving the vehicle. For discussion purposes, it may be assumed that the reaction torque between the traction wheel 22 and the patch of ice on which it rests is substantially zero. Accordingly, the traction wheel 22 starts to spin as soon as power is applied to the motors 32 and 34 by closing the start switch 78.

As described previously, each of the traction wheels 22 and 24 and its respective drive train exhibits a no-load torque which must be overcome by the motor driving torque in order to accelerate the wheel. The no-load torque has a value which is a function of the moment of inertia of the traction wheel and its drive train and of the frictional resistance of the drive train. Both traction wheels 22 and 24 and the respective drive trains are of the same design and hence have substantially the same no-load torque. For any given operating condition, the total load torque exhibited by either of the traction wheels at a given instant of time is the sum of its no-load torque and the reaction torque produced by its adhesive friction with the road.

FIGS. 4a and 4b depict in graphical form an illustrative example of operation of the traction drive system. It is noted that the graphs of FIG. 4a represent voltage as a function of time and, on the same time scale the graphs of FIG. 4b represent motor current and torque as a function of time. The no-load torque T1 is substantially contact for a given value of acceleration except for a reduction in value which occurs with initial motion due to the difference between static and dynamic friction. The threshold-load torque T2, in a similar manner, is substantially constant value but is much higher than that of the no-load torque. The threshold-load torque is that required to initiate motion of the vehicle whereas the no-load torque is that required to initiate rotation of a traction wheel when there is no adhesive friction with the road.

Assume that the start switch 78 is closed at time zero and that the driver has moved the control lever of the speed control device 82 to the usual starting position. As soon as the switch is closed, a transient current 106 starts to build up. Initially, the only limitation on the current is the impedance of the series circuit, i.e. the resistance and inductance of the field windings and armature windings of the motors 32 and 34. The current through the motors causes each motor to develop a torque 108 which varies directly with the square of the current. At a time t1 the driving torque of each motor has increased to the no-load torque T1. As a result, motor 32 and traction wheel 22 start to rotate while motor 34 and traction 24 remain at standstill. Rotation of motor 32 produces a counter EMF 112 which increases as a direct function of speed. Initially, the counter EMF 112 of motor 32 remains relatively small.

The motor current continues, after time t1, to increase toward a peak value but the rate of increase is reduced with increasing counter EMF while the time-decreasing value of inductive impedance tends to allow increasing current. As a result, the transient motor current 106, and hence the transient motor torque 108 continue to increase toward a peak value. At a time t2, the motor torque of each motor 32 and 34 reaches the thrshold-load torque T2. This causes the traction wheel 24 to start to rotate as a result of the driving torque of motor 34 and hence the vehicle starts to move. At time t2, the counter EMF of motor 22 is still small enough in relation to the battery voltage and the instantaneous value of impedance of the motor windings so that transient motor current 106 and motor torque 108 continue to increase toward a peak value. Motor 24 is rotated at a much lower speed that motor 22 because of the relatively heavy load torque which is the threshold-load value or greater. The motor 34 produces a counter EMF 114 which when added to the counter EMF 112 of motor 32 produces a total counter EMF 116. The total counter EMF opposes the battery voltage B+ leaving a net voltage V as the impedance drop across the motor windings. At a time following t2, the motor current 106 and the motor torque 108 reach a peak value and begin to decrease because of the increasing total counter EMF. The transient motor torque 108 exceeds the threshold-load torque T2 and the vehicle continues to move forward under the tractive effort of wheel 24. The motor current 106 and the motor torque 108 eventually reach a stable value above threshold torque T2 and the rotation of the traction wheel 24 continues.

Alternatively, the no-load torque characteristic of each traction wheel and drive train and the transient torque characteristic of the motors may be correlated so that the motor torque falls below the threshold-load torque after a predetermined time interval. During the predetermined time interval the vehicle will move forward by reason of the tractive effort of the wheel 24. If, after this travel, the traction wheel 22 remains on the patch of ice, i.e. without adhesive friction with the road, then wheel 22 continues to spin since the motor torque remains higher that the no-load torque. However, if the travel of the vehicle has moved the traction wheel 22 off the patch of ice to dry road surface the vehicle can be operated as described above with both traction wheels 22 and 24 on dry road. In the event that traction wheel 22 remains on the ice patch and continues to spin, as described above, the driver may turn the motors off and bring both wheels to a standstill then turn them on again to repeat the cycle just described. In this manner, the driver can move the vehicle off the ice patch to thereby obtain normal operation of the vehicle. The predetermined time interval may be established at a few seconds, for example in the range of four to eight seconds, during which the vehicle is moved by the tractive effort of one wheel while the other wheel spins without traction.

Although the description of this invention has been given with reference to a particular embodiment, it is not to be construed in a limiting sence. Many variations and modifications will now occur to those skilled in the art. For a definition of the invention reference is made to the appended claims.

What is claimed is:

1. An industrial truck having first and second independently rotatable traction wheels for driving contact with the road, both of said wheels exhibit substantially same start-up load torque and running-load torque when both have non-slip adhesive friction with the road, each traction wheel being subject to exhibiting a start-up load torque ranging from a threshold-load torque, which is a value of torque required to initiate motion of the truck when there is a non-slip adhesive friction with the road, to a no-load torque when there is no adhesive friction with the road, a DC voltage source, first and second DC series motors which are substantially identical to each other and are connected electrically in series with each other in a series circuit, each of said first and second DC series motors having an armature winding and a field winding connected in series with each other, switching means for connecting said series circuit across said voltage source for energizing said motors, said first and second DC series motors being mechanically coupled independently of each other in driving relation with said first and second wheels, respectively, each motor being capable of developing a predetermined transient driving torque when the wheel coupled to said each motor exhibits said no-load torque and the other wheel coupled to the other motor exhibits said threshold-load torque, said predetermined transient driving torque having a peak value at a time after motor energization, said peak value of said predetermined transient driving torque being greater than said threshold-load torque, whereby said truck is moved by the traction of the wheel which exhibits the threshold-load torque during a time interval that said peak value of torque is greater than the threshold-load torque.

2. The invention as defined in claim 1 including, speed control means connected in said series circuit for varying a voltage applied to said motors, and switching means connected in said series circuit for reversing the polarity of the voltage applied to the field windings of said motors.

3. The invention as defined in claim 1 wherein said time interval is in the range of about four to eight seconds.

* * * * *